US 6,645,327 B2

(12) United States Patent  (10) Patent No.: US 6,645,327 B2
Austin et al.  (45) Date of Patent: Nov. 11, 2003

(54) RF TAG APPLICATION SYSTEM

(75) Inventors: Pixie A. Austin, Marysville, WA (US);
Duane M. Fox, Snohomish, WA (US);
David N. Bledsoe, Mukilteo, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/942,206

(22) Filed: Aug. 28, 2001

(65) Prior Publication Data

US 2002/0062898 A1 May 30, 2002

Related U.S. Application Data

(63) Continuation-in-part of application No. 09/296,161, filed on Apr. 21, 1999, now Pat. No. 6,280,544.

(51) Int. Cl.$^7$ .......................... B32B 31/04; B32B 35/00
(52) U.S. Cl. .......................... 156/64; 156/263; 156/277; 156/362; 156/378; 156/387; 156/517; 156/556
(58) Field of Search .......................... 156/64, 277, 256, 156/257, 263, 387, 378, 510, 517, 521, 362, 556; 340/572.1

(56) References Cited

U.S. PATENT DOCUMENTS

| 5,512,125 A | 4/1996 | Momot et al. ............... 156/353 |
| 5,614,278 A | 3/1997 | Chamberlain et al. ..... 428/41.4 |
| 5,660,663 A | 8/1997 | Chamberlain et al. ...... 156/152 |
| 5,725,320 A | 3/1998 | Austin et al. ............... 400/642 |
| 5,867,102 A | 2/1999 | Souder et al. ............... 340/572 |
| 5,897,741 A * | 4/1999 | Mills et al. ............... 156/64 X |
| 6,019,865 A | 2/2000 | Palmer et al. ............... 156/265 |
| 6,123,796 A | 9/2000 | Kathmann et al. .......... 156/249 |
| 6,237,217 B1 * | 5/2001 | Bohn et al. |
| 6,280,544 B1 * | 8/2001 | Fox et al. ..................... 156/64 |
| 6,334,921 B1 * | 1/2002 | Duschek |
| 6,357,503 B1 * | 3/2002 | Kromer et al. ......... 156/361 X |
| 6,369,711 B1 * | 4/2002 | Adams et al. |
| 6,373,386 B1 * | 4/2002 | Duschek et al. |
| 6,404,341 B1 * | 6/2002 | Reid |
| 6,451,154 B1 * | 9/2002 | Grabau et al. |

FOREIGN PATENT DOCUMENTS

| DE | 199 59 849 | * 6/2001 |
| EP | 0 858 061 | * 8/1998 |
| WO | 01/76949 A2 * | 10/2001 |

* cited by examiner

Primary Examiner—Curtis Mayes
(74) Attorney, Agent, or Firm—Joan H. Pauly; Delbert J. Barnard

(57) ABSTRACT

Linerless label stock 102 is fed to a printer that prints on the front face 104 of the label stock 102 and then to a media cutter 224. The cutter 224 cuts the strip into discrete labels, which are fed to a tag application station 226. A strip of electronic tags is fed through an encoder that detects defective tags and then to a tag cutter 246 that cuts the strip into discrete tags. Defective tags exiting the cutter 246 are diverted away from the tag application station. Non-defective tags are conveyed to the tag application station 226 where they are secured to the back face of labels.

21 Claims, 8 Drawing Sheets

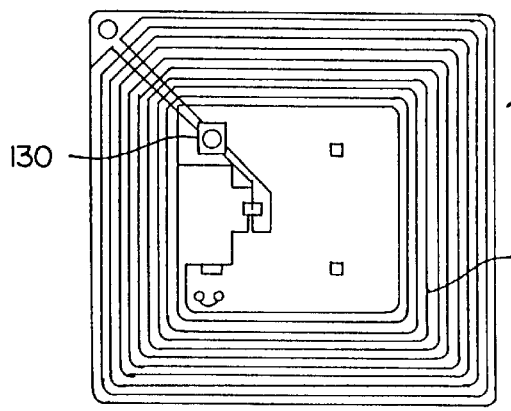
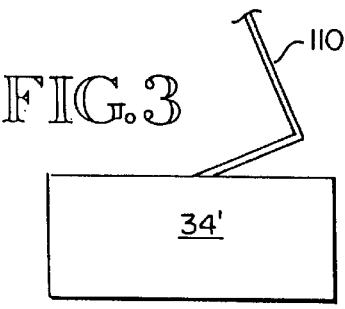
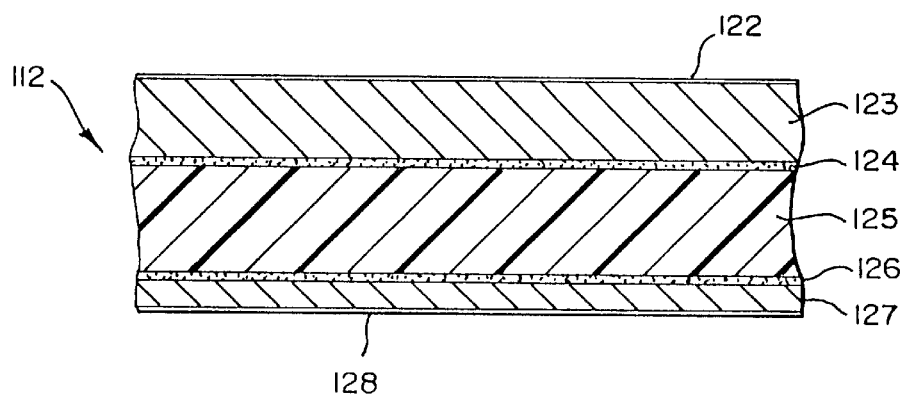
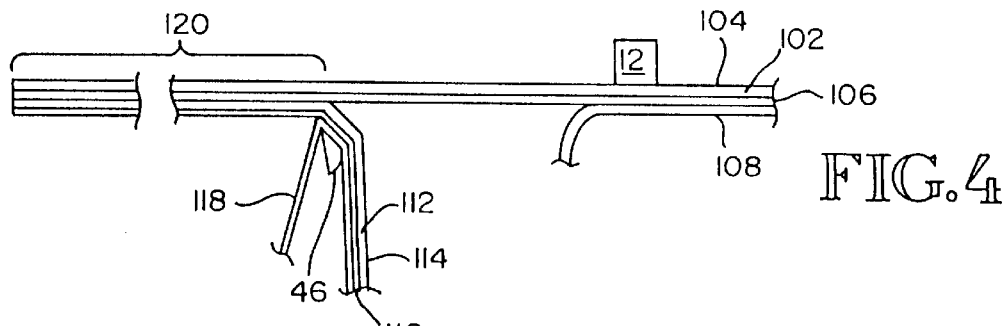
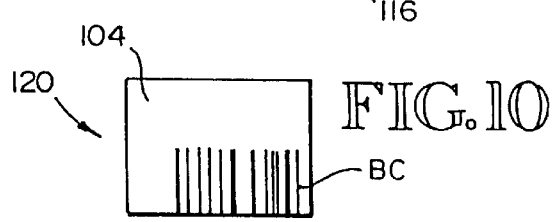
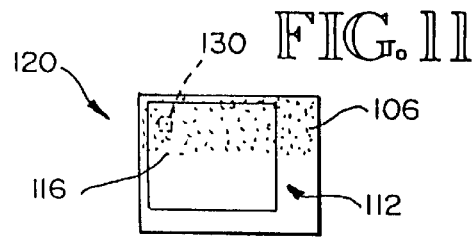

RF TAG APPLICATION SYSTEM

RELATED APPLICATION

This application is a continuation-in-part of application Ser. No. 09/296,161, filed Apr. 21, 1999, now U.S. Pat. No. 6,280,544.

TECHNICAL FILED

This invention relates to systems for labeling inventory, luggage of airline passengers, and other items. More particularly, it relates to a system for applying an electronic tag to the back face of a label using linerless label media.

BACKGROUND INFORMATION

There are many situations in which units of inventory and other items are labeled to assist in the identification and/or tracking of the items. The use of bar code labels on items for consumer purchase has become virtually universal. Bar code labels are also commonly used by shipping companies to identify packages being shipped. Another technique for identifying items is to apply radio frequency (RF) tags to the items. The tags may be active, i.e. transmit identifying signals without being queried by an outside source, or passive, i.e. provide an identifying signal only when activated by an inquiry signal. In the latter case, the inquiry signal is sufficient to energize the tag to enable the sending of the identifying signal. An advantage of RF tags, as opposed to bar codes, is that the orientation of the tag and the inquiring apparatus with respect to each other is non-critical in the case of the RF tags. An example of a type of RF tag is the tag sold by Texas Instruments under the trademark TIRIS. As used herein, the term "RF tag" is used broadly to include any type of magneto resonant tag.

The inventors perceived that it would be advantageous to embed RF tags into thermal or thermal transfer bar code labels or bar code labels produced by other printing processes. One approach would be to embed the tags at media conversion plants where the label media is prepared from large rolls of material by cutting the rolls into desired widths and, as appropriate, die cutting the reduced width sections of the rolls to produce the desired lengths of the labels. This approach has a number of serious drawbacks that make it impractical. First, several hundred different lengths and widths of die-cut labels are in common use. Label media and the material used to produce it typically include label stock, made from paper or plastic, having a front face for printing and an opposite back face with adhesive thereon, and a liner adjacent to the adhesive to prevent the adhesive from sticking to adjacent coils of label stock or other items prior to application of a label. The machinery required to apply RF tags between the labels and liner and then die cut the labels for all possible label sizes would be prohibitively expensive and complicated.

Another serious problem is that, once tags are applied to the labels, their additional and uneven thickness would cause serious problems in rewinding the converted stock into rolls. This drawback is present equally whether the conventional label stock/liner material is used or a type of linerless media is used. Because of considerations of waste and environmental protection, interest in use of linerless media has been increasing. The converted stock, with or without a liner, when wound into rolls, would have an uneven thickness that could cause the rolls to telescope. The increased thickness would also the reduce the number of labels which can be wound on a standard diameter roll to one-third the normal number. Another problem is that, in the current state of the technology, not every tag in a roll of tags is functional because of low production yields. If the tags are applied at the media conversion plant, each bad tag would result in the loss of a label.

Perhaps the most significant problem is the problem of printing over the tag area on a label that has a pre-applied RF tag. Even small RF tags occupy two square inches of area. Within this area, the overall media thickness increases from a nominal 0.007 inch (for label, liner and adhesive) to 0.011 inch. The portion of the tag on which the silicon chip is located is even thicker, with a nominal thickness of 0.022 inch. This last thickness would ordinarily require that no printing be allowed within a certain distance of the chip location. On small labels, this requirement could prevent any printing at all. The best situation that could be hoped for is that the labels would have to be reformatted to accommodate the "no-print zone". Such reformatting would cause additional time and expense and would be unacceptable to at least most customers of suppliers of printers and label media. In addition, printing a label that has a pre-applied RF tag would generally result in poor print quality in the vicinity of the tag.

The present invention seeks to provide labels having electronic, e.g. RF, tags while avoiding the problems discussed above in relation to embedding the tags at the media conversion plant where the label media is prepared for sale and shipment to customers.

BRIEF SUMMARY OF THE INVENTION

The present invention provides a system for printing labels and applying electronic tags to labels.

A subject of the invention is apparatus for forming printed labels having electronic tag thereon. According to an aspect of the invention, the apparatus comprises a media supply station configured to receive a linerless strip of label stock. A tag supply station is configured to receive a linerless strip of electronic tags. A tag application station is positioned to apply an electronic tag to the back face of a label. A print station has a printhead for printing on the front face of the label stock. The print station is positioned upstream of the tag application station and downstream of the media supply station. A media cutter is positioned upstream of the tag application station and downstream of the print station for cutting the strip of label stock into discrete labels. A media guide pathway extends between the media supply station and the tag application station. A tag cutter is positioned upstream of the tag application station and downstream of the tag supply station for cutting the strip of electronic tags into discrete tags. A tag guide pathway extends between the tag supply station and the tag application station.

As used herein, the term "electronic tag" includes any type of magneto resonant tag, as discussed above in relation to the term "RF tag" and, more generally, any type of magnetic or inductive tag or other tag having an electronic device, whether active or passive. The term "label stock" is used broadly to include adhesiveless ticket stock as well as label stock having an adhesive coated face.

According to another aspect of the invention, the linerless strip of label stock has a front face, an opposite back face, and a layer of adhesive on the back face. The media guide pathway is adhesive resistant. The apparatus also includes the other elements set forth in the previous paragraph.

The linerless strip of tags may have an adhesive-coated surface or lack such a surface. According to an aspect of the invention, the tag supply station is configured to receive a strip of electronic tags having an inner face, an opposite outer face, and a layer of adhesive on the outer face. The tag application station is positioned to bring the inner face of the electronic tags into contact with the back face of the labels. The tag guide pathway is adhesive resistant. In applications in which the label stock is adhesiveless, the outer face of the tags is brought into contact with the back face of the labels and the tag guide pathway need not be adhesive resistant.

It is anticipated that in most applications, the tag supply station will be configured to receive a strip of RF tags. In such case, a preferred feature is the inclusion in the apparatus of an RF read head positioned between the tag supply station and the tag application station to check for the presence of defective tags. Also preferably, the RF read head is positioned upstream of the tag cutter. In the preferred embodiment, the tag guide pathway includes a portion positioned to receive a defective tag from the tag cutter and divert the defective tag away from the tag application station.

The apparatus may also include various other additional features. One such feature is an RF read head downstream of the tag application station. Another such feature is the inclusion of an RF write head positioned between the tag supply station and the tag application station. As discussed further below, this feature is preferred for applications in which information to be written on the tag becomes known substantially contemporaneously with application of the label with the tag to an object.

Another subject of the invention is apparatus for forming labels having RF tags thereon. According to an aspect of the invention, the apparatus comprises a media supply station configured to receive a linerless strip of label stock as described above. A tag supply station is configured to receive a linerless strip of RF tags. A tag application station is positioned to apply an RF tag to the back face of a label. A media cutter is positioned upstream of the tag application station and downstream of the media supply station for cutting the strip of label stock into discrete labels. An adhesive resistant media guide pathway extends between the media supply station and the tag application station. A tag cutter is positioned upstream of the tag application station and downstream of the tag supply station for cutting the strip of RF tags into discrete tags. A tag guide pathway extends between the tag supply station and the tag application station. An RF read head is positioned between the tag supply station and the tag application station to check for the presence of defective tags. The apparatus also includes means for diverting defective tags off the tag guide pathway and away from the tag application station.

The means for diverting may take various forms. In the currently preferred embodiment, the RF read head is positioned upstream of the tag cutter. The means for diverting is positioned to receive a defective tag from the tag cutter.

The invention also encompasses a method of forming labels having information on a front face thereof and also including an electronic tag. According to an aspect of the invention, the method comprises providing a linerless strip of label stock having a front face with information thereon and an opposite back face. The strip is fed to a media cutter and, at the media cutter, the strip is cut into discrete labels. The discrete labels are fed to a tag application station. The method also includes providing a linerless strip of electronic tags. The strip of tags is fed to a tag cutter, and, at the tag cutter, the strip is cut into discrete tags. The tags are read to detect defective tags. Defective tags are diverted away from the tag application station. At the tag application station, an electronic tag that has been read and not found to be defective is applied to the back face of a label.

The providing of a linerless strip of label stock may be carried out by providing a strip of label stock that has been preprinted or otherwise has been provided with information thereon. Alternatively, the providing of the strip may include printing information on the front face of the label stock before cutting the strip of label stock. Reading the tags may be carried out before or after cutting the strip of electronic tags. Preferably, cutting the strip of electronic tags is carried out after reading the tags.

As used herein, the term "information" includes printed information in various forms. It includes both human readable information and machine readable information such as bar codes. It also includes information embodied in a nonprint medium, for example, magnetic or holographic information of the type commonly found on credit cards.

The system of the invention provides an efficient and effective method of preparing labels that have information on a front face and also electronic tags. This is accomplished with relatively simple apparatus and at reasonable expense. The resulting label/tag assemblies have dimensions at least substantially the same as non-tag-bearing labels so that their application to items to be identified and/or tracked is unaffected by the presence of the additional element of the tag. The system also provides an efficient and effective method of preparing adhesiveless tickets or claim checks that include electronic tags.

The provision of the preferred feature of an RF write head to write RF information to RF tags just before they are applied to the label stock greatly increases the versatility of the system. For example, the system may be used by airlines on luggage tags to facilitate identification and location of baggage without the need to orient particular items of baggage with respect to a scanner. The writing of the information contemporaneously with the printing of the label and, desirably, substantially contemporaneously with application of the label to luggage, allows the tag to be customized to include information about individual items of luggage that becomes known only at the time the luggage is checked with the carrier. Such individualized information may include, inter alia, the origin of the item, the destination of the item, and any special requirements for handling. For each luggage label produced, a corresponding claim check with corresponding RF information may also be produced.

The advantages and features discussed above and other advantages and features will become apparent from the detailed description of the invention that follows.

BRIEF DESCRIPTION OF THE DRAWINGS

In the drawings, like element designations refer to like parts throughout, and:

FIG. 3 is a fragmentary elevational view showing an alternative tag supply device.

FIG. 4 is an elevational view of the label media and strip of RF tags and its associated strip bar shown in FIG. 2. In FIG. 4, the thicknesses of the elements of the tags and media are greatly exaggerated for the purposes of illustration.

FIG. 5 is a plan view of an individual RF tag.

FIG. 6 is a fragmentary cross-sectional view of the tag shown in FIG. 5 illustrating, with greatly exaggerated dimensioning, the layers of the tag in the capacitor area.

FIG. 10 is a plan view of the front of a completed label/tag assembly.

FIG. 11 is a plan view of the back of the assembly shown in FIG. 10.

DETAILED DESCRIPTION OF THE DRAWINGS

Figure 1:
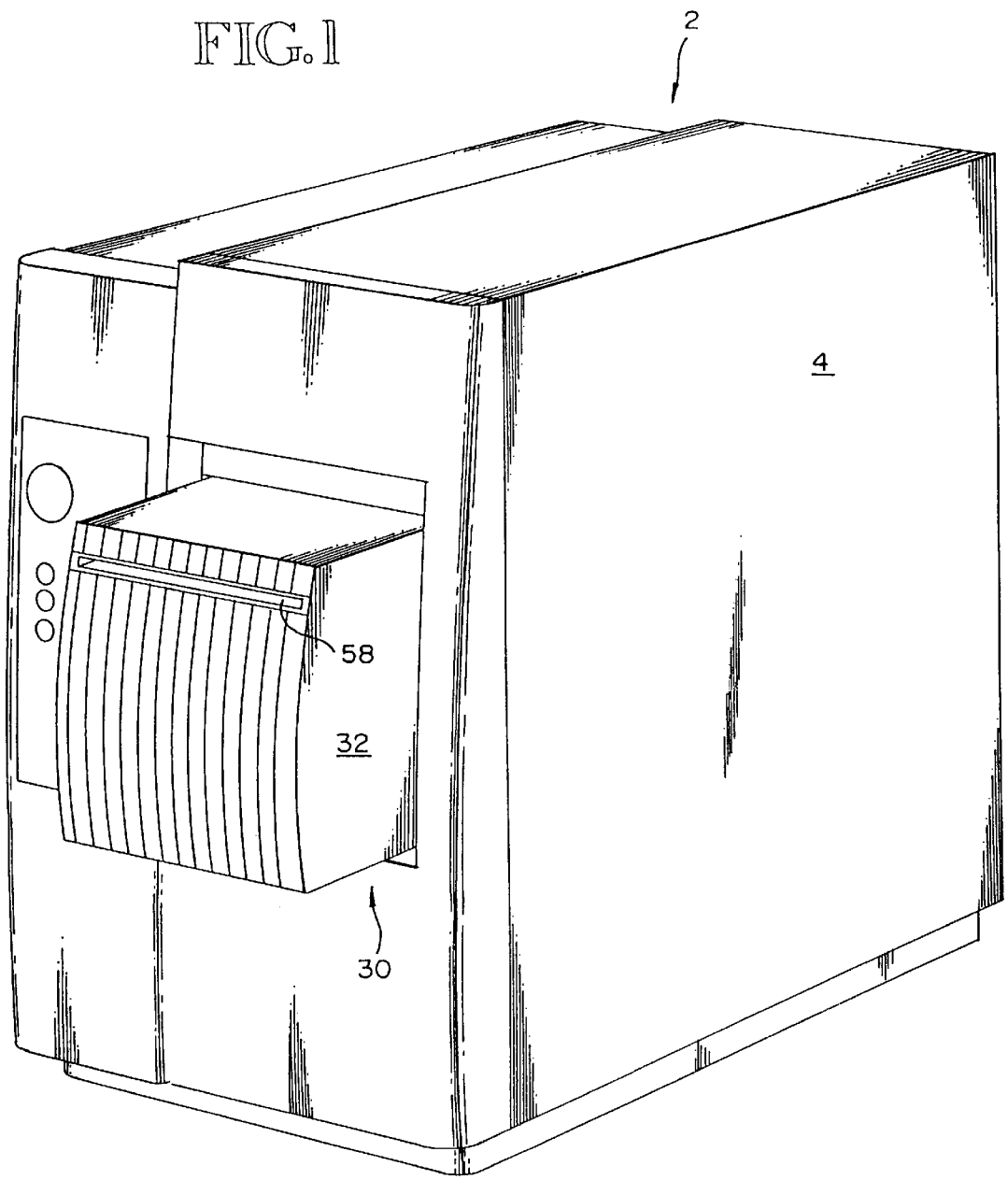
FIG. 1 is a pictorial view of a printer having a tag application attachment.
Figure 2:
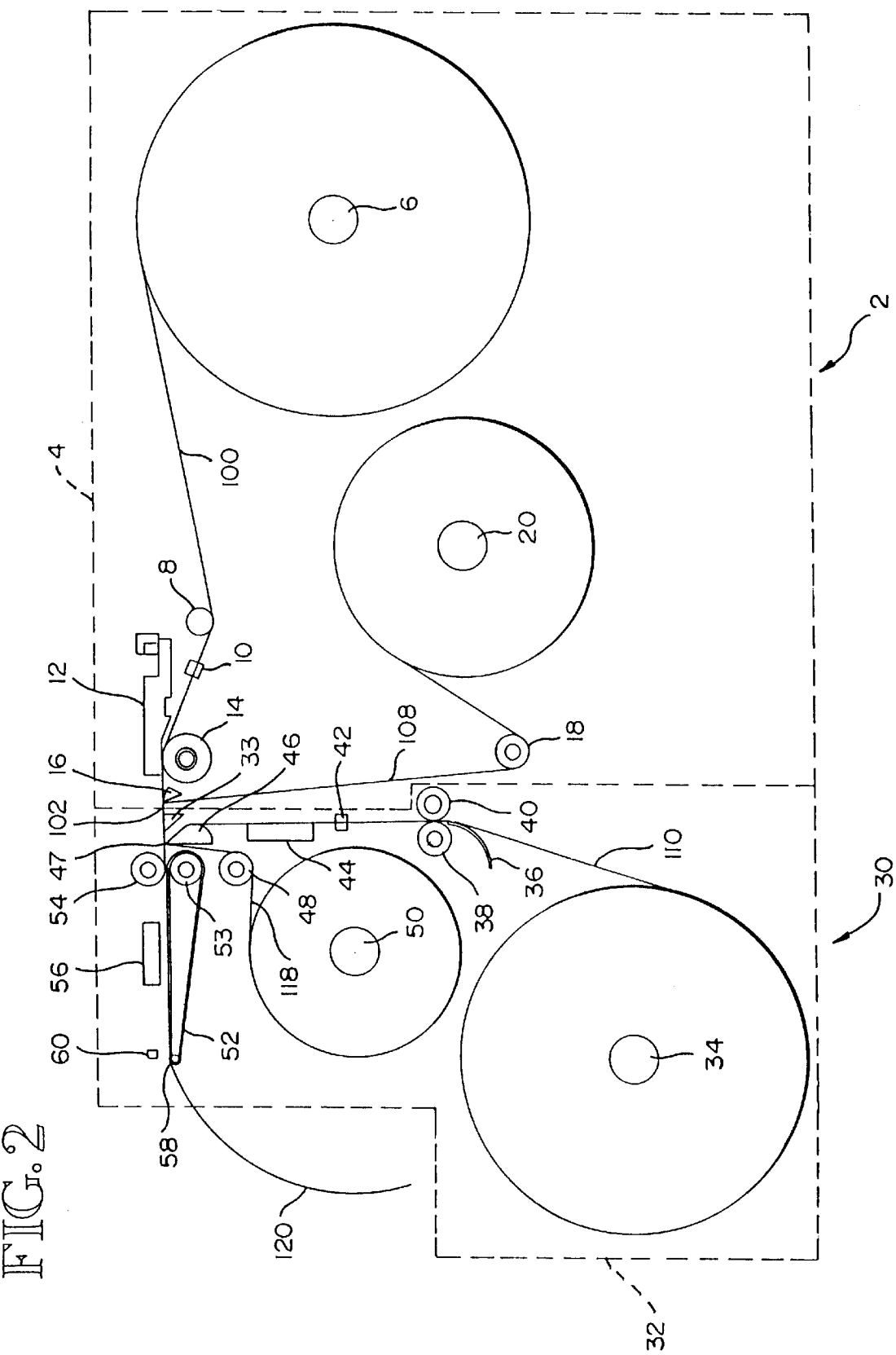
FIG. 2 is a schematic elevational view of the interior elements of the printer and attachment shown in FIG. 1.

The drawings illustrate apparatus and methods for forming printed labels having electronic tags thereon. The tag application portions of the apparatus may be provided in the form of an attachment for an existing printer. An attachment 30 is illustrated in FIGS. 1 and 2. As shown, the attachment 30 is mounted on an existing thermal printer 2 in the same location and on the same mounting points as a cutter attachment would be installed. This is only one of a number of possible mounting arrangements for a tag application attachment. The apparatus of the invention preferably comprises a printer that has, in its original manufacture, a tag applicator unit incorporated therein. Such printer/applicator devices could be designed to have certain advantages over a retrofit approach. These advantages may include reduced numbers of parts, simplified electronics and cabling, and larger tag capacities. The scope of the invention further encompasses tag application apparatus that stands alone and does not include printing elements.

Referring to FIGS. 1 and 2, the printer 2 has a housing 4 in which the working elements of the printer 2 are mounted. These working elements are illustrated in schematic form in FIG. 2. They include a media supply roller 6 for mounting rolls of label media 100. As shown, the label media 100 includes a strip of label stock 102 having an adhesive coated back face protected by a liner 108. However, the apparatus of the invention preferably is configured to receive a linerless label media. Still referring to FIG. 2, media 100 from the supply roller 6 is drawn from the supply roller 6 and extends along a media guide pathway around a guide roller 8 past a label gap sensor 10 to a print station having a printhead 12 for printing on a front face 104 of the label stock 102. The label gap sensor 10 detects in a known manner the downstream or leading edge of a label and measures the length of the label to accurately index the label with respect to the printhead 12 so that the printing on the label is properly positioned on the label. The printhead 12 may be one of various known types of thermal printheads or some other type of printhead, such as a dot matrix or laser printhead. At the location where the printhead 12 contacts the front face 104 of the label stock 102 to carry out the printing, the label stock 102 is backed by a platen roller 14 in a known manner.

Before the printed label media 100 exits the printer housing 4, the printed labels 102 are separated from the liner 108. This is accomplished by means of a label strip bar 16 that has a sharp or very small radius contact point at which the liner 108 bends around the strip bar 16 while the label stock 102 continues on a straight pathway out of the housing 4, as shown in FIG. 2. The liner 108 extends down around a liner strip drive roller 18 to a liner take-up roller 20. The drive roller 18 may be used to pull the label media 100 from the supply roller 6 and past the printhead 12. The separated label stock 102 exits the printer housing 4 through a preexisting opening.

As used herein, the term "strip bar" includes a very small radius roller or rod as well as the type of fixed member with a pointed or small radius strip point shown in FIG. 2.

The opening in the printer housing 4 is aligned with a corresponding entry opening in the housing 32 of the attachment 30. The label stock 102 enters the attachment 32 through the entry opening and extends across a support/guide member 33. Preferably, the surface of the member 33 that contacts the label stock 102 is adhesive resistant so that the stock 102 will not stick to the member 33. For example, the member 33 may be coated with a material such as the material sold under the trademark Teflon.

The attachment 30 is provided with a tag supply station configured to receive a strip of electronic tags 110. As illustrated in FIG. 2, the tag supply station is configured to receive a strip of RF tags and is in the form of a tag supply roller 34 mounted inside the attachment housing 32. The supply roller 34 could also be mounted outside the housing 32. An alternative form of the tag supply station is shown in FIG. 3 in simplified form. Referring to FIG. 3, the tag supply station comprises a fan fold box 34'. The strip of RF tags 110 is supplied in a fan fold arrangement, rather than the rolled arrangement illustrated in FIG. 2. The box 34' may be attached to the bottom of the attachment shown in FIG. 1 or may be supported on a floor or table adjacent to the printer/attachment combination 2, 30. When the tag supply station is external of the attachment housing 32, the tag supply station may be regarded as the externally mounted or supported roller 34 or box 34' and/or as the opening in the bottom of the attachment 30 through which the strip of RF tags 102 is received into the attachment 30.

Like the label media, the strip of RF tags is preferably provided in a linerless form. However, in the apparatus illustrated in FIG. 2, the strip of RF tags 110 includes a liner 118. Referring to FIG. 2, the strip 110 is drawn from the roller 34 and extends along a tag guide pathway that includes a curved guide plate 36 and guide rollers 38, 40 for guiding the strip 110. The guide rollers 38, 40 oppose each other in a known manner. The strip 110 extends from the rollers 38, 40 past a tag gap sensor 42 that verifies the location of the beginning of a tag and measures the length of the tag, in much the same manner that the label gap sensor 10 operates, to index the tag with the label to which it is to be applied. Past the sensor 42 is an RF write head 44 that electronically writes desired RF information onto a particular tag. This arrangement contemplates the tags being supplied in a nonfunctional form so that the tags can be customized at the point of use. In addition to indexing the tag location to the corresponding label, the sensor 42 ensures that the RF write head 44 is properly aligned with the tag.

The strip 110, including the liner 118, extends from the write head 44 to a tag strip bar 46 at a tag application station.

The bar 46 is configured to provide a sharp turn in the pathway for the liner portion 118 of the strip 110 at a contact location 47 to strip the tag from the liner portion 118. The sharp turn is provided by a sharp edge portion, i.e. a small radius portion or a more pointed portion, of the tag strip bar 46. At the contact location 47, the tag is brought into contact with adhesive 106 on the back face of the label 102. The adhesive 106 attaches the tag to the back face of the label 102, and the label/tag assembly continues to travel along the linear pathway over which the label stock 102 travels from the printhead 12 to the contact location 47. The liner 118 bends around the strip bar 46 and is separated from the tag in the same manner that the media liner 108 is separated from the label stock 102, as described above. The liner 118 extends down around a liner strip drive roller 48 to a liner take-up roller 50.

The label/tag assembly extends linearly from the contact location 47 to an adhesive resistant transport belt 52. The belt 52 is a known type of endless belt driven by a drive roller 53. Opposing the drive roller 53 is a laminating pressure roller 54 that exerts pressure on the label/tag assembly to ensure secure attachment of the tag 112 to the label 102. Adjacent to the upper run of the belt 52 along which the label/tag assembly is conveyed is an RF read head 56. The read head 56 verifies the information on the tag 112 and provides a quality check to ensure that the tag 112 has not been damaged by the procedure of applying it to the label stock 102. It also verifies the accuracy of the RF information and the proper functioning of the write head 44. The label/tag assembly is conveyed to a label removal location 58 at the downstream end of the belt 52. FIG. 2 illustrates a finished label/tag assembly 120 extending outwardly and downwardly from the removal location 58. For situations in which individual assemblies are to be prepared on an on demand basis, a sensor 60 is preferably provided adjacent to the removal location 58. The sensor checks for the presence or absence of a completed assembly to verify when the assembly has been removed from the removal location 58.

FIG. 4 illustrates in exaggerated detail the parts of the label media 100 and strip of RF tags 110 and the pathways the parts take as the materials 100, 110 pass through the apparatus 2, 30. Referring to FIG. 4, the label media 100 includes a strip of label stock 102 which has been die cut to separate the individual labels. The label stock has a front face 104 on which the printhead 12 prints information, such as bar code information. The back face of the label stock 102 opposite the front face 104 has adhesive 106 thereon. The adhesive 106 is protected by a liner 108.

Still referring to FIG. 4, the strip of RF tags 110 includes a layer of individual tags 112. The tags 112 are the same size as, or smaller than, the labels to which they are to be applied. The individual tags may be provided in the form of a substantially continuous strip of tag material that has been die cut to separate the individual tags 112. It may also be provided with gaps between the individual tags 112. This may be desirable in situations in which the tags 112 are shorter in length than the labels to which they are to be applied. The inner face 114 of each tag 112 is brought into contact with the adhesive coated back face 106 of the corresponding label to apply the tag 112 to the label. Preferably, the opposite outer face of the tag 112 is also coated with an adhesive 116. With this arrangement, the finished label/tag assembly 120 has an at least substantially continuous adhesive coating on its back surface regardless of the relative sizes of the labels and tags. Prior to stripping the tag 112 from its liner 118 and applying the tag 112 to the label, the adhesive-coated outer face of the tag 112 is protected by the liner 118.

FIGS. 5 and 6 illustrate the structure of a type of RF tag 112 manufactured by Texas Instruments. It is currently anticipated that a primary use of the system of the invention will be to apply tags of this type to bar code labels. FIG. 6 shows the cross section of a tag 112 in the capacitor area of the tag 112. Referring to FIG. 6, the two opposite surfaces of the tag 112 are each coated with gravure-resist ink. This ink helps protect the other layers of the tag against damage. Under the upper ink layer 122 is a top layer of aluminum 123. The lower surface of the aluminum 123 is secured to a base foil 125 by glue 124. It is anticipated that the base foil material will be polyester. The bottom surface of the base foil 125 is secured to a bottom layer of aluminum 127 by glue 126. The bottom layer 128 of gravure-resist ink is applied to the bottom surface of the bottom layer of aluminum 127. The aluminum layers 123, 127 provide the circuit components other than the silicon chip.

FIG. 5 shows a plan view of a typical tag 112. A substantial portion of the area of the tag 112 is occupied by the antenna 132, which is preferably provided in the winding configuration illustrated in FIG. 5. The most important portion of the tag 112, the silicon chip 130, is positioned in a corner portion of the center area of the tag 112 inside the windings of the antenna 132.

As noted above, a length difference in the tags 112 and the labels to which they are to be applied can be accommodated by the provision of gaps between the individual tags 112 on a strip 110 of tags. This approach to the problem of differential lengths may be possible but is likely to lead to undesirable complication of, and addition to the cost of, preparing the strips of RF tags 110. Another possible solution is to drive the transport of the tag strips 110 and the label media 100 at different rates. The illustrated arrangement of separate liner strip drive rollers 18, 48 for the label media and the tag media, respectively, can accommodate this approach. For example, the transport of the tag strip 110 may be driven by a stepper motor and discontinued while the excess portion of the length of the label continues along the pathway onto the belt 52 so that the next tag 112 on the strip 110 will be properly positioned for the next label. When the next label reaches the tag strip bar 46, the transport of the tag strip 110 is recommenced.

Figure 7:
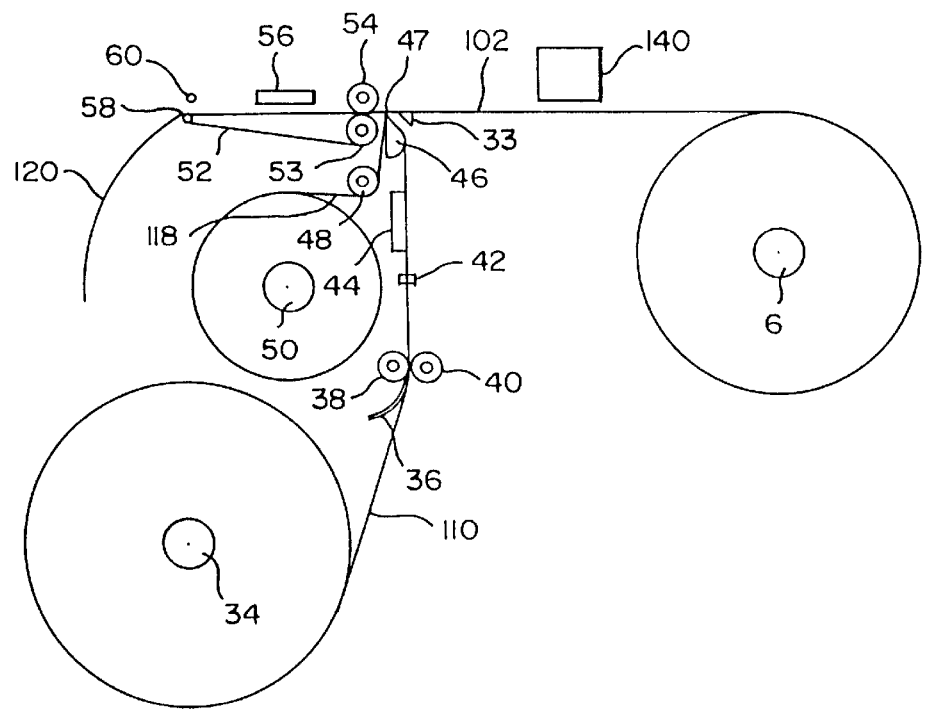
FIG. 7 is like FIG. 2 except that it shows another embodiment of apparatus for applying electronic tags to labels.

FIG. 7 illustrates apparatus that includes the media supply station, tag supply station, tag application station, and tag guide pathway shown in FIG. 2. The embodiment of FIG. 7 does not include the print station illustrated in FIG. 2 and has a modified media guide pathway that directly feeds media from the media supply roller 6 to the tag application station. As shown, the media stock 102 is provided without a liner. The stock 102 may be a type of linerless media with adhesive on the back face of the label stock 102 or may lack adhesive on the back face. If the stock 102 lacks adhesive, an adhesive layer may be provided on the surface of the tag that is applied to the back face of the stock 102 to secure the tag 112 to the stock 102. Alternatively, the embodiment of FIG. 7 could also include the media liner 108, label strip bar 16, liner strip drive roller 18, and liner take-up roller 20 shown in FIG. 2.

It is anticipated that the type of embodiment shown in FIG. 7, which lacks a printer or other means for placing information on the front face of the label stock 102, will be used in conjunction with media stock 102 into which information has been incorporated at a site remote from the location of the tag application apparatus. For example, the label stock 102 may include a strip of labels on the front faces of which has been printed bar code information or other machine readable or human readable information. The label stock 102 could also be provided with magnetic strips on the front face to provide the information in magnetic form. Further forms of the information are also possible. Referring to FIG. 7, the apparatus preferably includes a label reader 140 for reading the information on each label in the label stock 102. The reader 140 may be, for example, a bar code scanner or a magnetic stripe reader.

Figures 8, 9:
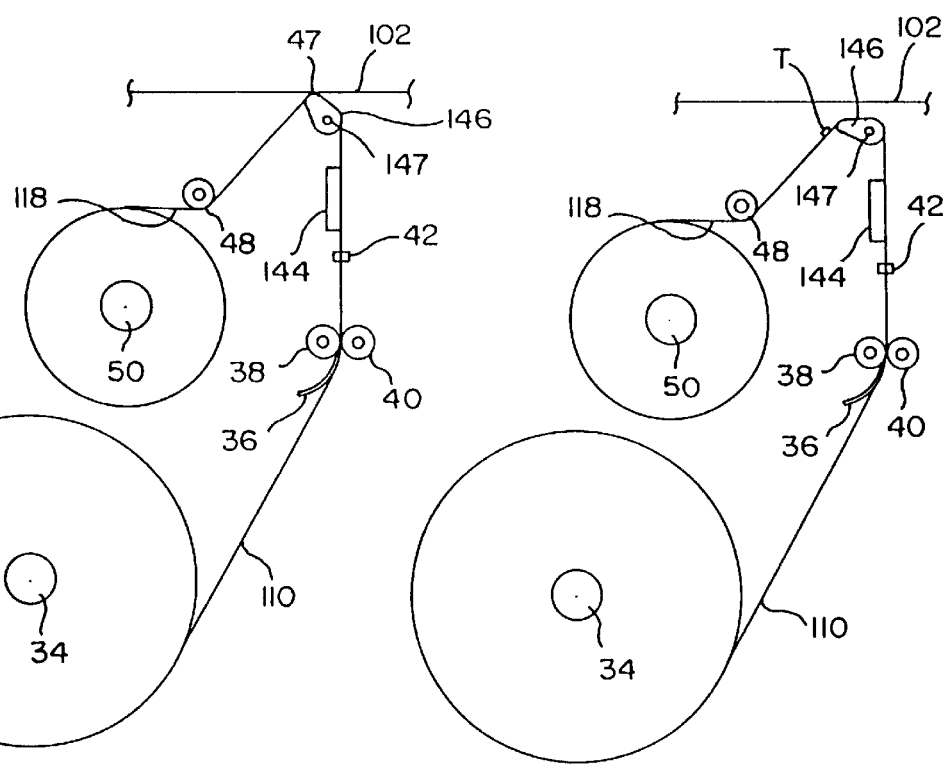
FIG. 8 is a schematic elevational view of a modified form of the portion of the apparatus shown in FIG. 7 for supplying and applying the tags.
FIG. 9 is like FIG. 8 except that it shows the pivotable tag strip bar in a different position to prevent application of a selected tag to a label.

FIGS. 8 and 9 illustrate a feature that may be provided to minimize waste of label stock. Referring to FIGS. 8 and 9, the apparatus includes a tag supply roller 34, guide plate 36, guide rollers 38, 40, tag gap sensor 42, liner strip drive roller 48, and liner take-up roller 50 as shown in FIGS. 2 and 7 and described above in connection with FIG. 2. The main difference between the tag application apparatus shown in FIGS. 8 and 9 and that shown in FIGS. 2 and 7 is the structure of the tag strip bar and the apparatus just upstream thereof. Referring to FIGS. 8 and 9, a tag reader 144 is positioned upstream of the tag application station in place of the RF write head 44 shown in FIG. 2 and described above. The tag reader 144 may be an RF read head or a device for reading an electronic tag other than an RF tag. In accordance with the invention, as each tag passes the tag reader 144, the reader 144 is operated to determine if the tag is defective. When a tag is found to be functional and not defective, it continues along the normal pathway to the tag application station around the tag strip bar 146 to the contact location 47 at which the tag is brought into contact with the back face of the label stock to be applied to the back face. This operation is the same as the operation of the embodiment shown in FIG. 2.

The advantage of the feature illustrated in FIGS. 8 and 9 is its capability of preventing a defective tag T from being applied to the label stock 102. For this purpose, the tag strip bar 146 is pivotably mounted on a pivot shaft 147. The bar 146 has a sharp edge portion, as shown a small radius portion, which provides the sharp turn in the pathway for the tag liner to strip the tag from the liner, as described above. When a defective tag has been detected, the bar 146 is pivoted about its pivot shaft 147 to pivot the sharp edge portion away from the contact location 47, as illustrated in FIG. 9. The pivoting of the bar 146 changes the pathway of the strip of tags to prevent the defective tag T from reaching the tag application station and being applied to the label stock 102. As can be seen in FIG. 9, the defective tag T remains on the liner 118 to be wound up with the liner 118 on the liner take-up roller 50. Once the defective tag T has moved away from a position in which it could be applied to the label stock 102, the bar 146 is pivoted back to the position shown in FIG. 8 to permit subsequent nondefective tags to be applied.

FIGS. 10 and 11 illustrate a label/tag assembly 120 that may be produced using the apparatus and method described above. FIG. 10 shows the front face 104 of the assembly 120 on which bar code information BC has been printed. FIG. 11 shows the opposite back surface of the assembly. As can be seen in FIG. 11, the back face of the label stock portion of the assembly includes an adhesive coating 106 thereon. The coating 106 is at least substantially coextensive with the back face and serves to secure the tag 112 to the back face. The surface of the tag 112 opposite the back face also has adhesive 116 thereon. The adhesive 116 on the tag 112 cooperates with the adhesive 106 on the label stock 102 to form an at least substantially continuous adhesive coating on the back surface of the label media formed by the label/tag assembly. The assembly is preferably essentially the same size as a similar label not having an electronic tag.

A preferred feature of the invention is reading the tag before it is applied to the label so that bad tags can be discarded without wasting label stock. FIGS. 8 and 9 illustrate an embodiment of this feature, as described above. This feature is particularly useful since, under the current state of the technology, the occurrence of bad tags that are not written properly or cannot be read properly is about four percent. In addition to saving label stock, checking the tags before application will also eliminate the need to reprint bad laminated labels. A possible variation is to use tags that are not die cut and do not have adhesive or liner applied. In such embodiments, a cutter could be used to cut each individual tag before applying it to the label. This approach would have the advantage of reducing the cost of tag material but could not be used on relatively small labels since the tag would cover too much of the label's adhesive surface for the label to adhere properly to an item to which it is applied. The apparatus may be used in connection with batch printing as well as on demand printing. For batch printing of label stock with a liner, instead of winding the label liner onto a take-up roller, the liner could be routed under the tag application station. Rollers would then reapply the label with the tag to the liner and the completed assemblies on the liner would either be fed out in small groups for tear off or rewound on a powered rewinder for larger batches.

Figure 12:
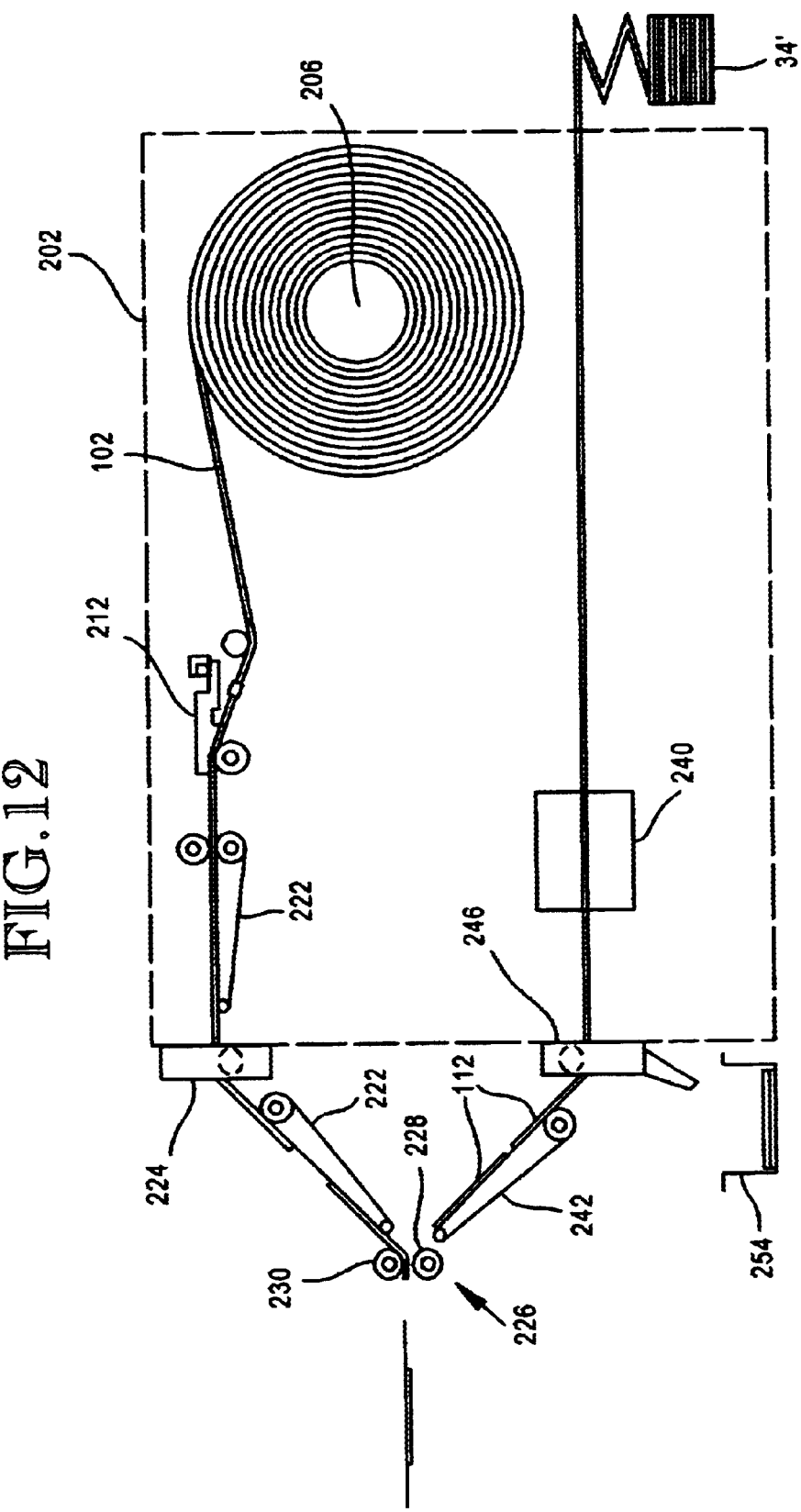
FIG. 12 is a schematic elevational view of the interior elements of the currently preferred embodiment of the apparatus of the invention.
Figure 13:
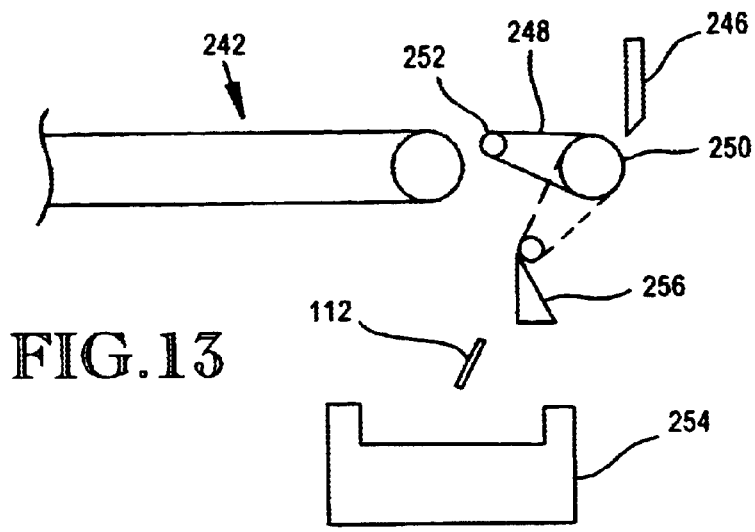
FIG. 13 is a schematic elevational view of a portion of the tag guide pathway shown in FIG. 12.

FIGS. 12 and 13 illustrate the currently preferred embodiment of the present invention. Referring to FIG. 12, the apparatus includes a housing 202 in which the elements of the apparatus are mounted, including both the label related elements and the tag related elements. As in the apparatus shown in FIG. 2, the elements include a media supply roller 206 for mounting rolls of label media. Unlike the label media illustrated in FIG. 2, the media illustrated in FIG. 12 is linerless. It consists of label stock 102 with a front face 104 and adhesive 106 on an opposite back face, and lacks the liner 108 shown in FIG. 2. The label stock 102 could also lack the adhesive 106 if tickets, such as baggage claim checks, as opposed to labels to be secured to objects, are being formed. Referring to FIG. 12, the elements also include a printhead 212 that defines a print station. A media guide pathway 222 supports and guides the label stock 102 from the supply roller 206 to the print station 212 and out of the print station 212. From the print station 212, the guide pathway extends to a media cutter 224. The media cutter 224 may take any of a variety of known configurations. The cutter 224 cuts the strip of label stock 102 into discrete labels. The discrete labels exit the cutter 224 and proceed along the media guide pathway to a tag application station 226. At the tag application station 226, the guideway 222 delivers the discrete tags to an application point defined by a drive roller 228 and an opposite pressure roller 230.

The apparatus includes a tag supply station that may take the form of a tag supply roller 34, as shown in FIG. 2, or a fan fold box 341, as shown in FIG. 3 and also in FIG. 12. In the embodiment illustrated in FIGS. 12 and 13, the tag supply station is configured to receive a linerless strip of electronic tags. Preferably, the tags have an inner face and an opposite outer face on which there is a layer of adhesive. The strip of tags is supported and guided along a tag guide pathway 242 from the tag supply station 341 to the tag application station 226. From the tag supply station 341, the strip of tags extends to and through an encoder 240. When the strip of electronic tags comprises a strip of RF tags, the encoder preferably includes an RF read head and/or an RF write head. The inclusion of a read head allows the tags to be read before they are applied to labels so that defective tags can be discarded without wasting label stock. As discussed above, in certain situations, it is also desirable to write information onto the tags as part of the process of preparing the label/tag assembly so that the information can be written onto the tags substantially contemporaneously with the application of the tags to objects to be tracked.

From the encoder 240, the tag guide pathway 242 extends to a tag cutter 246 and then to the tag application station 226. The apparatus could also be provided with an RF read head (not shown in FIG. 12) downstream of the tag application station 226 to verify that the process of preparing the label/tag assembly has not damaged the tag.

Preferably, the apparatus includes means for diverting defective tags off the tag guide pathway and away from the tag application station 226. FIG. 13 illustrates an embodiment of the diverting means. The tag guide pathway includes a portion 248 positioned to receive a defective tag from the tag cutter 246 and divert the defective tag away from the tag application station 226. Referring to FIG. 13, the guideway portion 248 includes a short run of an endless belt driven by a drive roller 250 positioned at one end, which is adjacent to the exit from the tag cutter 246. The opposite end of the guideway portion 248 extends around a small radius roller 252 that is mounted to freely rotate. When a defective tag has been detected, the guideway portion 248 pivots downwardly, in substantially the same fashion that the tag strip bar 146 shown in FIGS. 8 and 9 pivots downwardly, to redirect a defective tag T. This can be accomplished, for example, by pivoting the small radius roller 252 downwardly. FIG. 13 shows in phantom the downwardly pivoted position of the guideway portion 248. When the portion 248 pivots downwardly, it directs the defective tag into a discard receptacle 254. A strip bar 256 may be provided to ensure that the defective tag is disengaged from the guide portion 248.

As noted above, both the label stock 102 and the tag strip may have an adhesive coated surface but lack a liner. Therefore, the portions of the media guide pathway 222 and the tag guide pathway 242 that contact the adhesive 106, 116 on the label stock or the tags are preferably adhesive resistant. The desired adhesive resistance can be provided by the simple expedient of providing the guide pathways 222, 242 in the form of a plurality of runs of endless belts with the belts being made from an adhesive resistant material or having their contact surfaces coated with an adhesive resistant material.

Figure 14:
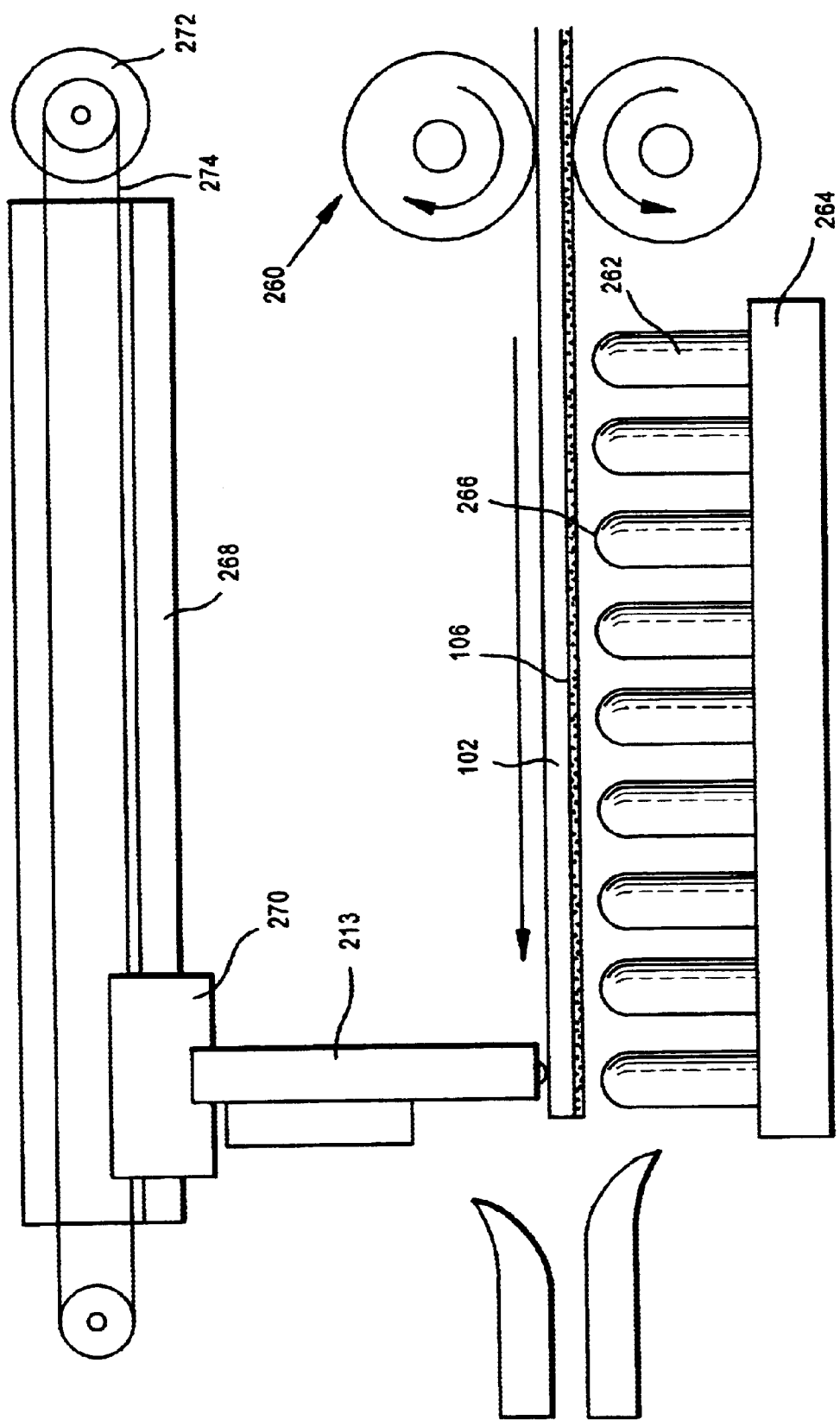
FIG. 14 is an elevational view of an alternative for the structure of the print station.
Figure 15:
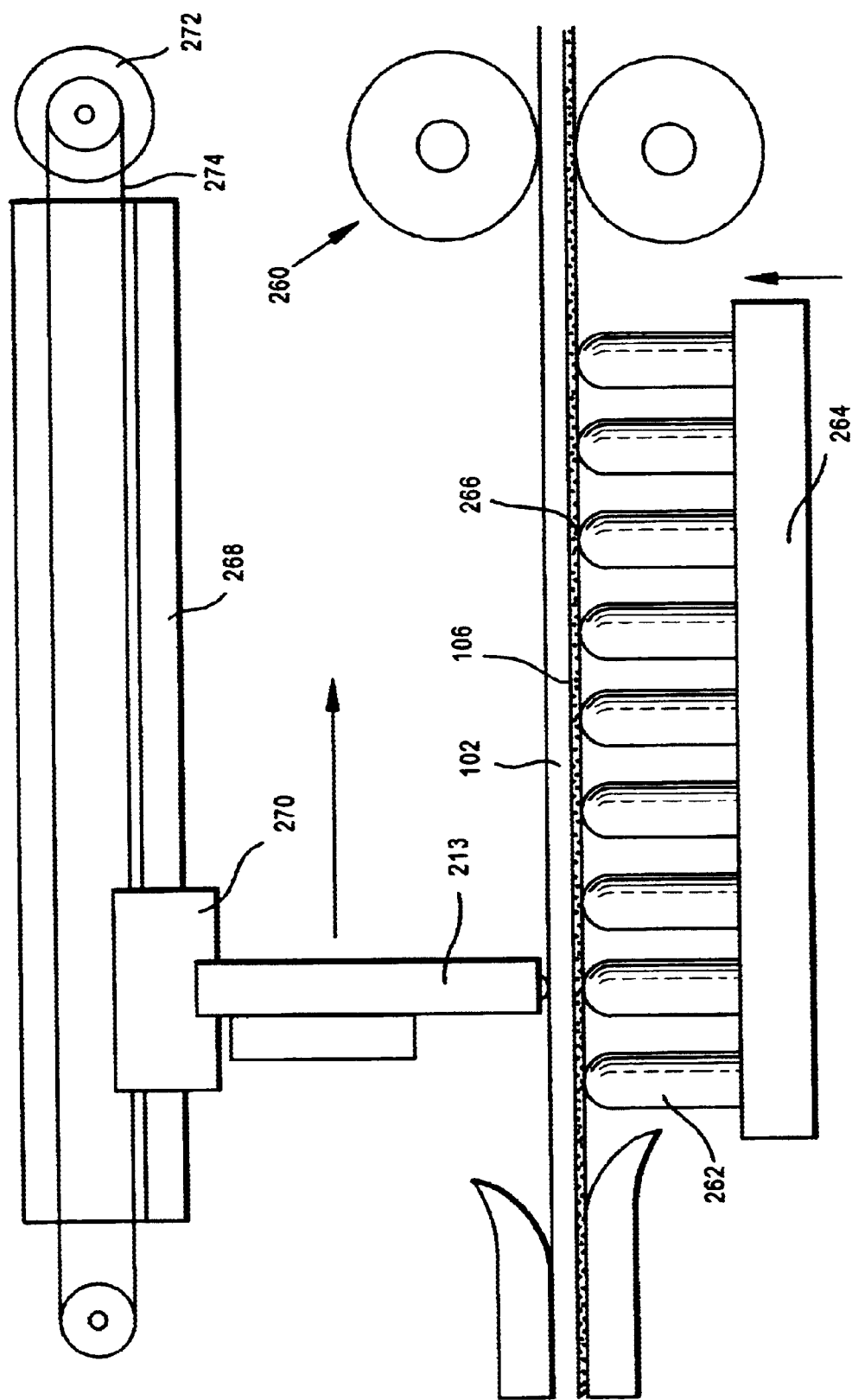
FIG. 15 is like FIG. 14 except that it shows the projections that serve as the platen in a raised position.

A different approach to providing adhesive resistance in the printing station is illustrated in FIGS. 14 and 15. In a typical printer, the printhead 12 is fixed opposite a platen element and the media 102 moves through the station for printing. In the printing station shown in FIGS. 14 and 15, the linerless media 102 moves into the printing station, stops and is supported in a manner which is not conducive to adhesive transfer or sticking, and then the printhead 213 is moved over the stationary media 102. As shown in FIGS. 14 and 15, the linerless media 102 is moved into the printing station by a drive roller pair 260. The "platen" comprises a plurality of vertical projections 262 carried by a base 264. The projections 262 have tops 266 which provide a minimum contact area with the adhesive 106. Preferably, they are also made of or at least topped with a material, texture, or coating which further resists the adhesive 106 adhering or transferring thereto. The base 264 moves between a lowered position, shown in FIG. 14, and a raised position, shown in FIG. 15. This feature further assures that the adhesive 106 will not adhere to the tops 266; but, it can be omitted if desired in a less complex mechanism without undue probability of adhesive adherence.

The printhead 213 is carried on a track 268 by a member 270. The member is movable along the track 268 by a motor 272 through a connecting wire 274. Other motive approaches such as a screw drive could also be employed.

The media 102 is moved into the printing station, the platen projections 262 are raised to support the stationary media 102, and the printhead 213 is moved over the media 102 to print on it. After printing, the projections 262 are lowered, the media 102 is withdrawn from the printing station, and the printhead 213 is returned to its starting position, shown in FIG. 14. It should be noted that the printing station could also print bi-directionally. In that case, the printhead 213 would remain at one end or the other and then print in the opposite direction for the next label.

Figure 16:
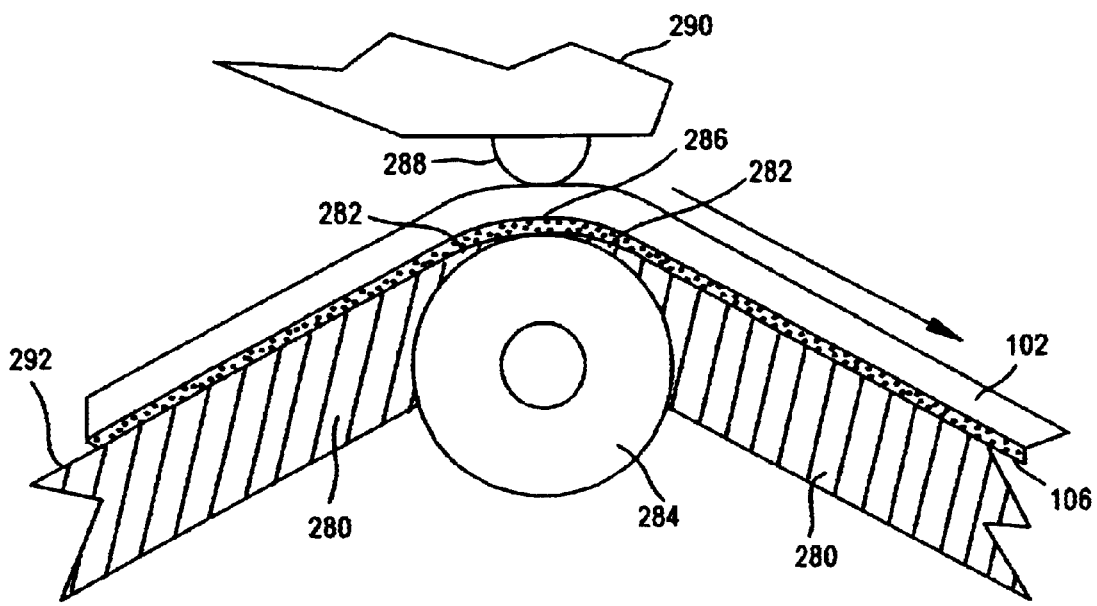
FIG. 16 is an elevational view of another alternative for the structure of the print station, with parts shown in section.

FIG. 16 illustrates another approach to adapting a conventional print station to print on linerless media. In this approach, a pair of platen roller guards 280 are positioned as shown with bridge elements 282 extending over the platen roller 284 on each side so as to leave only a small exposed portion 286 directly under the printing elements 288 of the printhead 290. The platen roller guards 280 are made of a non-sticking material with respect to the adhesive 106 or, in the alternative, have a top surface 292 to which the adhesive 106 does not stick. Polytetrafluroethlene (sold under the trademark Teflon) is a well-known material that can be used for the guards 280 in total or as a lining material for the top surface 292. Alternatively, the top surface 292 could be plasma coated with an appropriate non-sticking material of a type known to those of ordinary skill in the art and/or made of a patterned material, for example, a knurled surface. To assist in the adhesive 106 not sticking to the platen roller 284 within the limited exposed portion, it is preferred that the platen roller 284 also be made of or have an outer surface of a non-stick or sticking resistant material.

The approaches to configuring a print station to print on linerless media shown in FIGS. 14–16 and discussed above are further described in U.S. Pat. No. 5,725,320. These approaches and modifications thereof may also be used in other portions of the apparatus, for example, at the cutter stations 224, 246.

In the preferred embodiment of the method of the invention, a linerless strip of label stock 102 and a linerless strip of electronic tags 112 are provided, as discussed above. The strip of label stock 102 is fed to a media cutter 224 where the strip is cut into a plurality of discrete labels. The discrete labels are then fed to a tag application station 226. The strip of electronic tags 112 is fed to a tag cutter 246, where the strip is cut into a plurality of discrete tags 112. Before reaching the tag cutter 246, the strip passes through an encoder 240, which reads information on the tags or writes information onto the tags, as described above. Preferably, the tags are read to detect defective tags. Tags that are found to be defective are diverted away from the tag application station 226, as described above. At the tag application station, a tag that has been read and not found to be defective is guided between the drive roller 228 and pressure roller 230 at the same time that the corresponding label is guided therebetween. The adhesiveless inner face of the tag, or, in the case of application to adhesiveless label stock, the adhesive coated outer face, is brought into contact with the adhesive 106 on the back face, or the adhesiveless back face, of the label. The action of the pressure roller 230 against the drive roller 228 ensures that the tag is securely attached to the back face of the label. In most situations, the method also includes printing information on the front face of the label stock before cutting the strip of label stock.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. Apparatus for forming printed labels having electronic tags thereon, comprising:
   a media supply station configured to receive a linerless strip of label stock having a front face, an opposite back face, and a layer of adhesive on said back face;
   a tag supply station configured to receive a linerless strip of RF tags;
   a tag application station positioned to apply an electronic tag to said back face of a label;
   a print station having a printhead for printing on said front face, said print station being positioned upstream of said tag application station and downstream of said media supply station;
   an RF read head positioned between said tag supply station and said tag application station to check for the presence of defective tags:
   a media cutter positioned upstream of said tag application station and downstream of said print station for cutting said strip of label stock into discrete labels;
   a media guide pathway extending between said media supply station and said tag application station
   a tag cuter positioned upstream of said tag application station and downstream of said tag supply station for cutting said strip of electronic tags into discrete tags; and
   a tag guide pathway extending between said tag supply station and said tag application station.

2. Apparatus for forming printed labels having electronic tags thereon, comprising:
   a media supply station configured to receive a linerless strip of label stock having a front face, an opposite back face, and a layer of adhesive on said back face
   a tag supply station configured to receive a linerless strip of electronic tags;
   a tag application station positioned to apply an electronic tag to said back face of a label;
   a print station having a printhead for printing on said front face, said print station being positioned upstream of said tag application station and downstream of said media supply station;
   a media cutter positioned upstream of said tag application station and downstream of said print station for cutting said strip of label stock into discrete labels;
   an adhesive resistant media guide pathway extending between said media supply station and said tag application station;
   a tag cutter positioned upstream of said tag application station and downstream of said tag supply station for cutting said strip of electronic tags into discrete tags; and
   a tag guide pathway extending between said tag supply station and said tag application station.

3. The apparatus of claim 2, in which said tag supply station is configured to receive a strip of electronic tags having an inner face, an opposite outer face, and a layer of adhesive on said outer face; said tag application station is positioned to bring said inner face into contact with said back face; and said tag guide pathway is adhesive resistant.

4. The apparatus of claim 3, in which said tag supply station is configured to receive a strip of RF tags, and which further comprises an RF read head positioned between said tag supply station and said tag application station to check for the presence of defective tags.

5. The apparatus of claim 4, wherein said RF read head is positioned upstream of said tag cutter.

6. The apparatus of claim 5, wherein said tag guide pathway includes a portion positioned to receive a defective tag from said tag cutter and divert said defective tag away from said tag application station.

7. The apparatus of claim 2, in which said tag supply station is configured to receive a strip of FRF tags, and which further comprises an RF read head positioned between said tag supply station and said tag application station to check for the presence of defective tags.

8. The apparatus of claim 7, wherein said RF read head is positioned upstream of said tag cutter.

9. The apparatus of claim 8, wherein said tag guide pathway includes a portion positioned to receive a defective tag from said tag cutter and divert said defective tag away from said tag application station.

10. The apparatus of claim 2, in which said tag supply station is configured to receive a strip of RF tags, and which further comprises an RF write head positioned between said tag supply station and said tag application station.

11. The apparatus of claim 10, further comprising an RF read head downstream of said tag application station.

12. The apparatus of claim 2, in which said tag supply station is configured to receive a strip of RF tags, and which further comprises an RF read head downstream of said tag application station.

13. Apparatus for forming labels having RF tags thereon, comprising:
   a media supply station configured to receive a linerless strip of label stock having a front face, an opposite back face, and a layer of adhesive on said back face
   a tag supply station configured to receive a linerless strip of RF tags;
   a tag application station positioned to apply an RF tag to said back face of a label;
   a media cutter positioned upstream of said tag application station and downstream of said media supply station for cutting said strip of label stock into discrete labels;
   an adhesive resistant media guide pathway extending between said media supply station and said tag application station;
   a tag cutter positioned upstream of said tag application station and downstream of said tag supply station for cutting said strip of RF tags into discrete tags;
   a tag guide pathway extending between said tag supply station and said tag application station;
   an RF read head positioned between said tag supply station and said tag application station to check for the presence of defective tags; and
   means for diverting defective tags off said tag guide pathway and away from said tag application station.

14. The apparatus of claim 13, in which said tag supply station is configured to receive a strip of RF tags having an inner face, an opposite outer face, and a layer of adhesive on said outer face; said tag application station is positioned to bring said inner face into contact with said back face; and said tag guide pathway is adhesive resistant.

15. The apparatus of claim 14, wherein said RF read head is positioned upstream of said tag cutter, and said means for diverting is positioned to receive a defective tag from said tag cutter.

16. The apparatus of claim 13, wherein said RF read head is positioned upstream of said tag cutter, and said means for diverting is positioned to receive a defective tag from said tag cutter.

17. The apparatus of claim 13, which further comprises an RF write head positioned between said tag supply station and said tag application station.

18. The apparatus of claim 13, further comprising an RF read head downstream of said tag application station.

19. A method of forming labels having information on a front face thereof and also including an electronic tag, comprising:

provide a linerless strip of label stock having a front face with information thereon and an opposite back face;

feeding the strip of label stock to a media cutter, and, at the media cutter, cutting the strip of label stock into discrete labels feeding the discrete labels to a tag application station providing a linerless strip of electronic tags;

feeding the strip of electronic tags to a tag cutter, and, at the tag cutter, cutting the strip of electronic tags into discrete tags;

reading the tags to detect defective tags;

diverting defective tags away from the tag application station; and at the tag application station, applying an electronic tag that has been read and not found to be defective to the back face of a label.

20. The method of claim 19, wherein providing a linerless strip of label stock comprises printing information on the front face of the label stock before cutting the strip of label stock.

21. The method of claim 19, wherein cutting the strip of electronic tags is carried out after reading the tags.

* * * * *